United States Patent [19]

Clay

[11] 3,817,120

[45] June 18, 1974

[54] MEANS FOR RELATIVELY VARYING THE POSITION OF AN AXIS

[76] Inventor: Frank W. Clay, 1565 Kamole St., Honolulu, Hawaii 96821

[22] Filed: July 18, 1972

[21] Appl. No.: 272,806

[52] U.S. Cl.............................. 74/571 L, 280/229
[51] Int. Cl....................... F16h 29/04, B62m 1/00
[58] Field of Search............ 280/229, 226 R, 226 A; 74/836, 837, 117, 121, 571 R, 571 L; 60/571

[56] References Cited
UNITED STATES PATENTS

| | | | |
|---|---|---|---|
| 833,746 | 4/1908 | Robbins............................. | 280/229 |
| 2,335,645 | 11/1943 | Celio................................. | 74/571 R |
| 3,180,178 | 4/1965 | Brown et al...................... | 74/571 R X |
| 3,230,717 | 1/1966 | Alden................................ | 60/571 |

*Primary Examiner*—Evon C. Blunk
*Assistant Examiner*—James W. Miller
*Attorney, Agent, or Firm*—Cushman, Darby & Cushman

[57] ABSTRACT

A means for varying the distance between a revolving part of a rotating body and the axis of rotation of that body. The movement is provided by a pair of parallel reciprocating single-acting oppositely arranged hydraulic motors having opposite corresponding ends connected to the wheel with the other ends secured together and guided for linear movement relative to the wheel, in directions parallel to a diameter thereof. These other ends carry between them the wheel axle, movable along the aforesaid diameter, into a position coaxial and an infinite number of positions eccentric, relative to the wheel. The motors are hydraulically connected together for flow of fluid therebetween under control of a manually-controllable reversible check-valve.

6 Claims, 9 Drawing Figures

MEANS FOR RELATIVELY VARYING THE POSITION OF AN AXIS

BACKGROUND OF THE INVENTION

1. Field of the Invention

This invention relates to a means for varying the distance between a revolving part of a rotating body and the axis of rotation of that body.

2. Prior Art

There are many places where the invention as herein described can be utilized, generally, any place where there is a need to translate a revolving part of a rotating member either relative to some framework or to the rotating member itself.

One such area of use is in the wheel of a bicycle or other similar vehicle, where there is a desire to vary the position of the axle of the wheel relative to the wheel itself, thus causing an eccentric reciprocating motion of the frame of the bicycle to simulate the riding of a horse. Several means have been devised in the past for accomplishing this purpose, all of which utilize purely mechanical means to accomplish this task. As a result, certain limitations on the use of this mechanism have become apparent.

One feature, which is desirable in a mechanism for varying the position of the axle of the wheel, is the ability to do so while the wheel is rotating. In order to accomplish this by purely mechanical means, a limited number of positions for the movement of said axle can be used. These generally are only two: (1) where the axis of rotation is concentric with the axis of symmetry of the hub, and (2) a single position where the axis of rotation is eccentric to the axis of symmetry of the hub. Such a mechanism is shown in J. W. Daniels U.S. Pat. No. 3,371,944.

Another desirable feature of a mechanism for changing the position of the axle of a wheel is a large selection of possible positions where the axle may be fixed relative to the axis of symmetry of the wheel, the best possible selection being an infinite number of positions. This desirable feature has been accomplished by the use of purely mechanical means as in the A. D. Robbins U.S. Pat. No. 985,369, but at the expense of the ability to change positions while the wheel is rotating.

Thus, although mechanisms have been devised to accomplish several of the desirable features of such an apparatus when used in a vehicle as described above, none of these mechanisms has been able to accomplish this task without sacrificing some other desirable feature.

In addition to the possible use of the present invention for changing the position of the axle relative to the axis of symmetry of a vehicle wheel, this type of mechanism may be utilized to change the position of a revolving part of a rotating member relative to some external framework rather than to the axis of symmetry of the rotating member. Such an application is perceived where there is a desire to vary the length of the stroke of a crank arm relative to an input or output power shaft. In such a device, an input or output member, usually a pulley and belt or gear arrangement, is attached to a crank shaft mounted for rotation in a stationary member. Attached to an eccentric portion of the crank would be a connecting rod which in turn would be connected to a piston or similar power input or output device. In the past, in order to vary the stroke of this connecting rod it was necessary to replace it or have some means for varying its length. As an alternative to changing the rod, the length of the crank arm could be changed thus changing the stoke. This also required to replacement of parts or adjustment of the attaching point. To accomplish any of the changes mentioned, it was necessary to stop the machine which resulted in uneconomical time loss.

SUMMARY OF THE INVENTION

The present invention overcomes the above described difficulties by providing a means for varying the position of a revolving part of a rotating member relative to the axis of rotation and providing an infinite number of possible positions to which said part can be moved while the member is rotating. The part may be moved in either direction and can be held in any desired position, all movement being caused by the application of an external force to the part.

The present invention includes two hydraulic motors positioned perpendicular to the axis of revolution of the rotating member, and on opposite sides thereof. These hydraulic motors are connected to a valve mechanism by tubes which allow the passage of hydraulic fluid from the valve to the hydraulic motors. The valve consists of two ball valves, one positioned in an end of each tube to allow hydraulic fluid to freely flow into the tubes and thus into the hydraulic motors, but prohibiting the flow of hydraulic fluid out of the motors. A valve control lever is provided internally in the valve mechanism and positioned so that when it is rotated in one direction it will unseat one of the ball valves to allow fluid to flow from one motor through the valve and into the other motor and when the valve lever is moved in the opposite direction it will allow the other ball valve to be unseated, thus allowing fluid to flow in the other direction. Externally connected to this valve lever, is a linkage system which can be manually controlled.

DETAILED DESCRIPTION OF THE PREFERRED EMBODIMENTS

Figure 1:
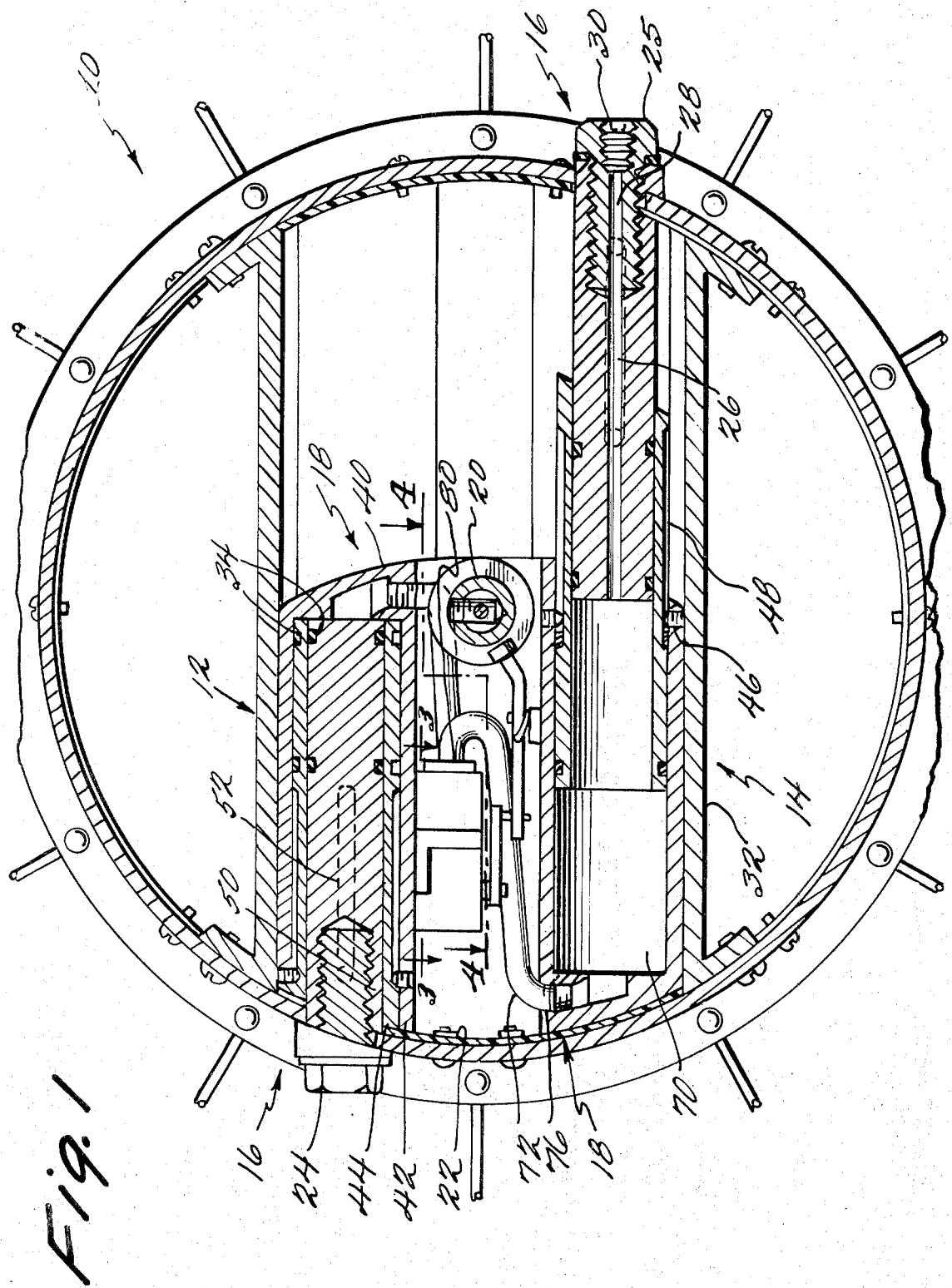
FIG. 1 is a side elevational view partly in vertical section, of the hub portion of the front wheel of a bicycle embodying this invention.
Figure 2:
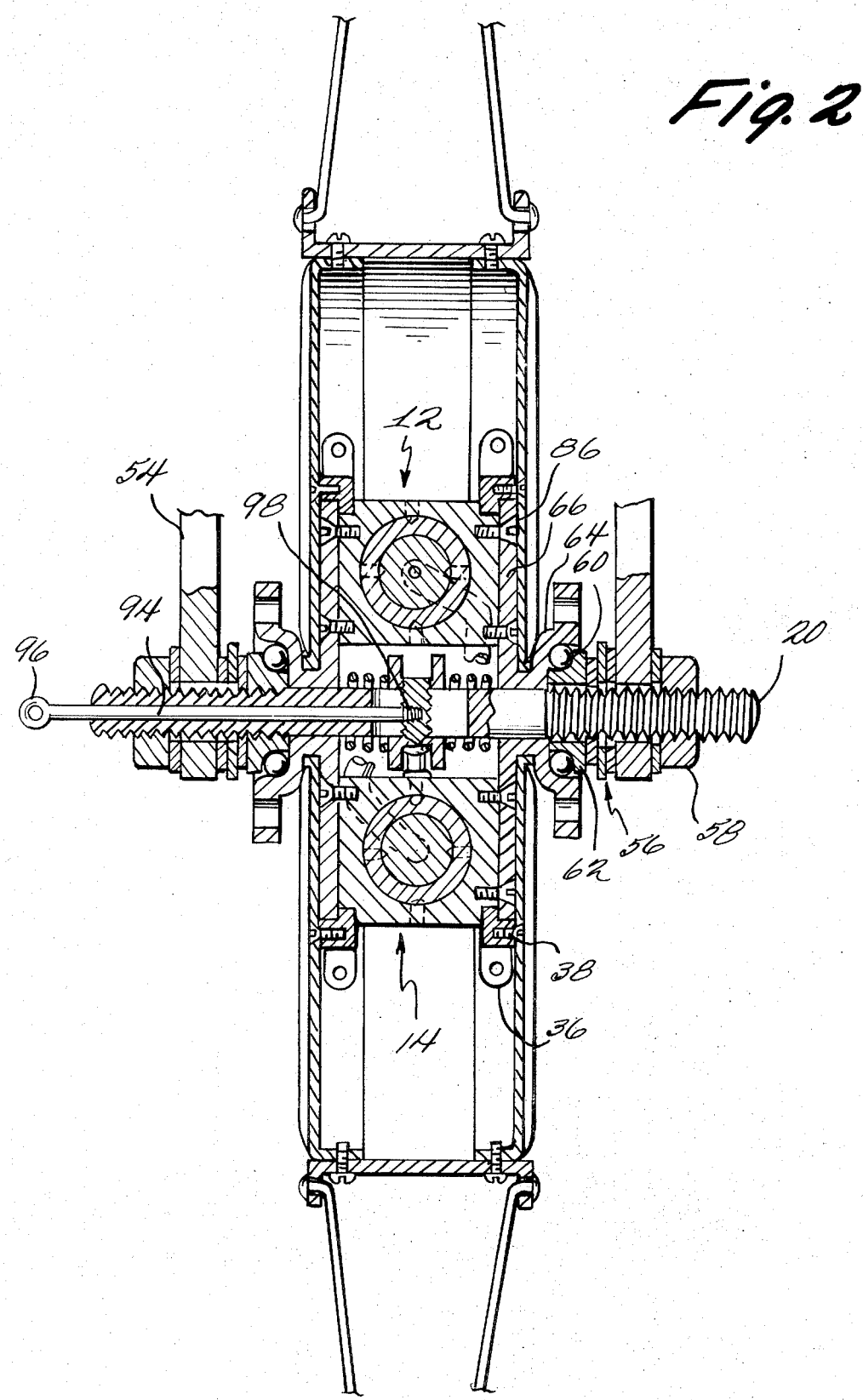
FIG. 2 is a horizontal sectional view of the wheel shown in FIG. 1.

Referring first to FIGS. 1 and 2, there is shown an annular center hub portion 10 of a wheel having disposed therein two parallel reciprocating single-acting oppositely-arranged hydraulic motors 12 and 14. Opposite corresponding ends 16 of the motors 12 and 14 are connected to the hub portion while the other ends 18 are secured together and guided for linear movement relative to the hub portion 10 in directions parallel to a diameter thereof. These other ends 18 carry between them a wheel axle 20 movable, along the aforesaid diameter, into a position coaxial and an infinite number of positions eccentric, relative to the hub portion 10. The motors 12 and 14 are hydraulically connected together for flow of fluid therebetween under control of a manually-controllable reversible check-valve 22. In the arrangement shown, the pistons 16 of the motors 12 and 14 are connected to the hub portion 10 and the cylinders 18 carry the axle 20, but it will be understood that this arrangement of the motors 12 and 14 could be reversed.

The two motors 12 and 14 are substantially identical so a description of one will suffice for both. Each motor is connected to the annular hub portion 10 by a bolt 24 which extends through an appropriate hole in the hub portion and into a tapped aperture in the outer end of the corresponding piston 16. One of the pistons 16 is provided with an axial bore 26 communicating with an axial bore 28 in the bolt 24 for filling and replenishing, the hydraulic fluid in both motors 12 and 14. The head of the bolt 25, having an axial bore 28, is provided with a threaded closure plug 30. Preferably, the motors 12 and 14 are of the telescopic-type to permit greater extension with a smaller fully-retracted length than would be possible with a two piece motor. For this purpose each motor 12, 14 is provided with a sleeve 32 telescopingly engaged between the cylinder 18 and the piston 16. Appropriate seals 34 are provided between the sleeve 32 and the cylinder 18 and between the sleeve and the piston 16.

The cylinders 18 of the motors 12, 14 have a generally rectangular outline in transverse section, as shown in FIG. 2, and are mounted for linear movement parallel to a diameter of the hub portion 10 in appropriate chordal guideways 36 secured, as by screws 38, to the hub portion 10. Both ends 40 and 42 of the cylinder 18 of each motor 12 and 14 are of curved configuration complementary to the curvature of the interior of the hub portion for snug engagement therewith when the motor is fully extended or fully retracted. The other end 44 of the sleeve 32 of each motor 12 and 14 is curved correspondingly to the corresponding end of the cylinder for the same purpose. In this connection, the sleeve 32 of each motor 12 and 14 is held against rotation by appropriate keys 46, here shown as screws threaded through the wall of each motor into engagement in an axial keyway 48 in the sleeve, to retain the curved outer end 44 of the sleeve in position for flush engagement with the curved inner surface of the hub portion. The keyways 48 are of limited length to prevent overextension of each sleeve 32. Desirably, each sleeve 32 is keyed to the corresponding piston 16 by a key 50 threaded through the outer end of the cylinder 18 and engaged within an axial keyway 52 of limited length in the piston 16. It will be seen, from an inspection of FIG. 1, that when a motor 12 or 14 is fully extended, the keys 46 and 50 are at the end of the keyways 48 and 52 for positive extension of the sleeve 32.

Referring now to FIG. 2, there is shown a wheel axle 20 carried between the two arms 54 of a front fork (only the lower ends of the arms of which are shown) of a bicycle. Each end of the axle 20 is conventionally threaded and secured to the forks by conventional washers 56 and nuts 58. The axle 20 is journalled in ball bearings 60, one on each side of the wheel hub portion 10. The inner race 62 of each bearing is threadingly engaged with the axle 20. The outer race 64 of each bearing has a peripheral flange 66 secured, as by screws 68, to the opposed faces of the motor cylinders 18. This flange 66 also overlies a portion of the guideways 36 for the cylinders 18 to securely maintain the latter in appropriate relation to the guideways.

Figure 3:
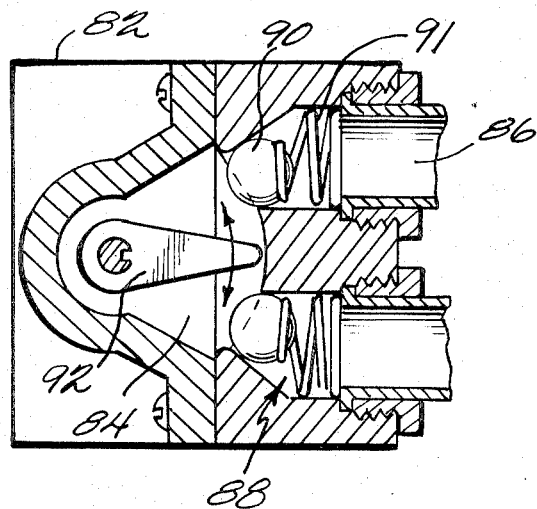
FIG. 3 is a cross-sectional view of the valve mechanism shown in FIG. 1.

The inner chambers 70 of the two motors 12 and 14 are connected together by appropriate conduits 72. One end 76 of each conduit 72 is connected to the corresponding motor 12 or 14, preferably at the closed ends of the cylinder, while the other end 80 of each conduit is connected to a manually controllable reversible check valve 22 having a housing 82 provided with an inner chamber 84 (FIG. 3). The chamber 84 has two passageways 86 opening thereto. In each passageway 86, adjacent the chamber 84, is a ball check valve 88 which normally prevents flow of fluid from the passageway 86 into the chamber 84. It will be noted, however, that the ball 90 of each ball check valve 88 protrudes into the chamber 84 when seated, and can be unseated by a manually operable lever 92 which is pivotally mounted in the chamber 84 to alternately engage the ball 90 of one or the other ball check valve 88 to unseat the same. It also will be noted that the lever 92 has a neutral position between the balls 90 of the two ball check valves 88 where neither is unseated.

Referring again to FIG. 2, a manual valve control lever 94 extends through the center of the axle 20 along its longitudinal axis and is free to slide back and forth in the axle. One end portion 96 of the manual control lever 94 is a ring which is attached to some external mechanical linkage which the rider may manipulate while positioned on the bicycle so as to cause the lever 94 to move back and forth within the axle 20. The other end 98 of lever 94 is threaded and extends into the central portion of the hub 10 and is threaded into screw 100 (FIG. 4) to a cylindrical member 102 having two disc portions 104. A slot 106 is cut in the axle 20 to allow movement of the cylindrical member 102 back and forth along the axle.

Figure 4:
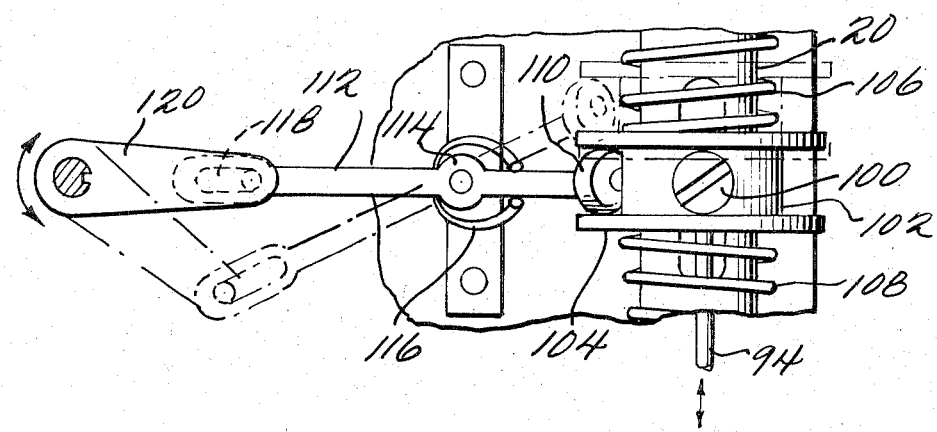
FIG. 4 is a fragmentary sectional view taken generally on line 4—4 of FIG. 1.

Referring now more particularly to FIG. 4, a spring 108 is provided on both sides of the cylindrical member 102 and about the axle 20 so that the normal position of the cylindrical member 102 is in the center of the hub and is held there by the spring 108. As lever 94 is moved back and forth, the cylindrical member 102 will also be moved and the spring 108 will attempt to return the cylindrical member to its original position. Thus, when pressure is released from lever 94 the cylindrical member 102 will be forced into its neutral position in the center of the hub 10.

Confined between the two discs 104 is a roller 110 which is attached to one end of a valve control lever 112. The lever 112 is pivotally attached in its central portion 114 to hydraulic cylinder 14. A spring 116 is provided to return lever 112 to a neutral position as shown in FIG. 4 and which also assists spring 108 in returning the cylindrical member 102 to its neutral position. At the other end of lever 112 is a slotted portion 118 which is pivotally attached to a valve control lever 120.

Figure 5:
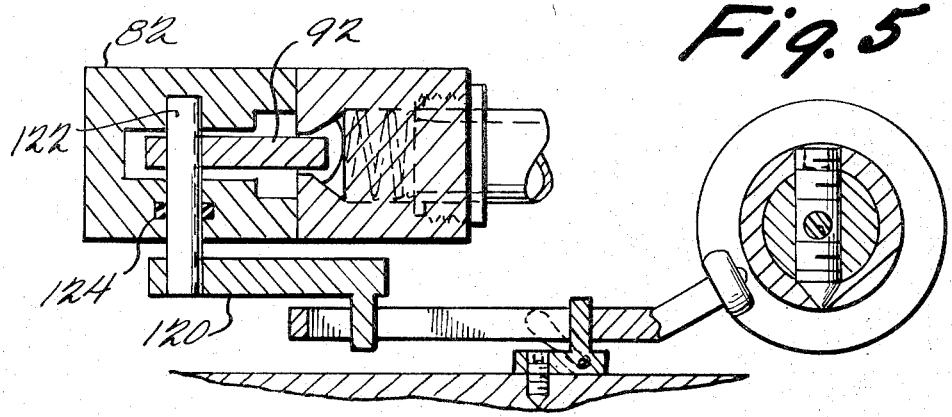
FIG. 5 is a fragmentary side elevation view in partial cross-section of the valve mechanism shown in FIG. 3 and control mechanism therefor.

Referring now to FIG. 5, the valve control lever 120 is attached to a shaft 122 which is mounted in the valve mechanism 22 and is provided with a seal 124 to prevent the leakage of hydraulic fluid out of the valve mechanism 22. Also attached to the shaft 122, but internally in the valve mechanism 22, is a valve lever 92, better seen in FIG. 3.

Figure 6:
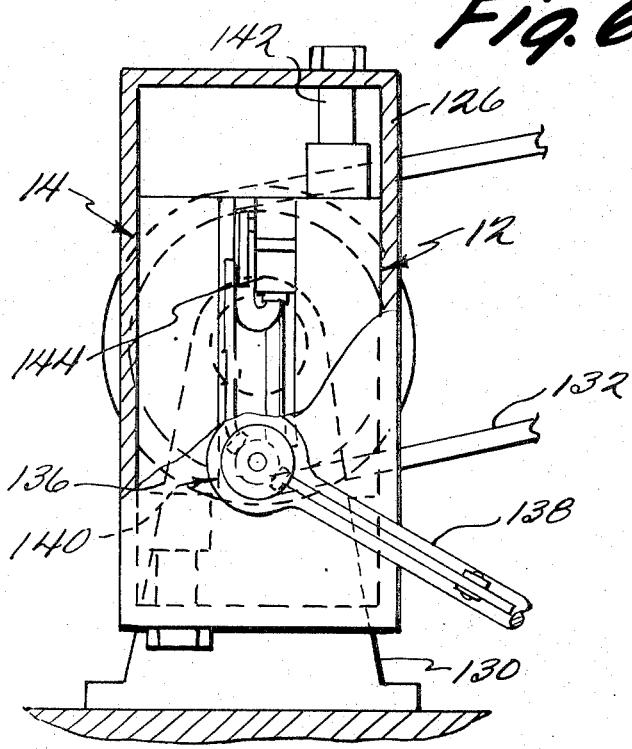
FIG. 6 is a vertical sectional view of another embodiment of the invention for use in varying the stroke of a connecting rod.
Figure 7:
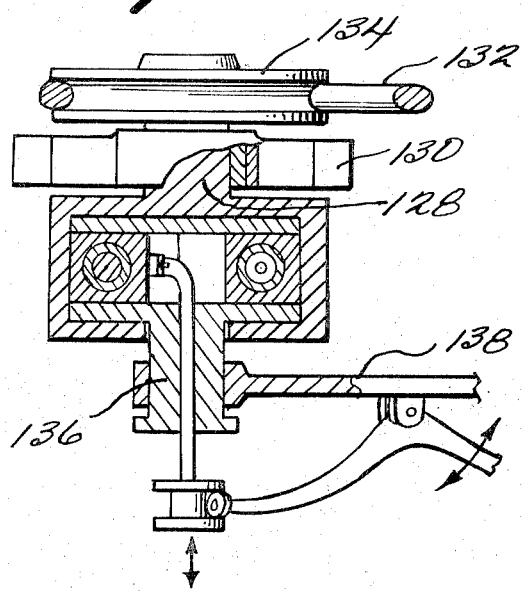
FIG. 7 is a horizontal partial sectional view showing further details of the embodiment shown in FIG. 6.

Referring now to FIG. 6 and 7, there is shown another embodiment of the invention which includes a housing 126 journalled by a stub shaft 128 for rotation about a fixed axis in a supporting structure or stand 130. The housing 126 is equivalent to the wheel of the first described embodiment of the invention in that the wheel rotates about an axis fixed relative to its periphery, although such axis translates as the wheel rotates along the ground. For purposes of illustrating the invention, the housing is rotated by a belt 132, driven from an appropriate source (not shown), trained over a pulley 134 fixed to the stub shaft 128 of the housing 126. Projecting from the other side of the housing 126 is another stub shaft 136, eccentrically mounted with respect to the first stub shaft 128, so that the housing essentially constitutes a crank arm. A connecting rod 138 is pivotally connected to the stub shaft 136 to reciprocate any appropriate structure, such as the piston (not shown) of a pump.

The shaft 136 is adjustable radially with respect to the axis of the driven stub shaft 128 in the same manner as the axle 20 of the previously described embodiment is adjustable. For this purpose, double-acting oppositely disposed hydraulic motors 12 and 14 are mounted within the housing and having one end 140 thereof connected to the stub shaft 136, and the other end 142 thereof connected to the housing 126. A valve 144, equivalent to valve 22, controls the flow of the fluid between the chambers of the motors 12 and 14.

Figure 8:
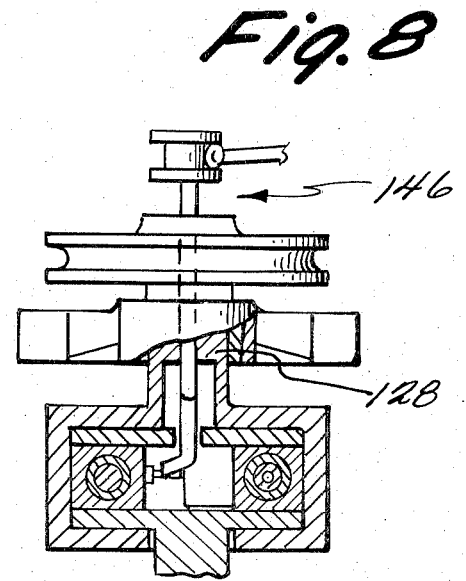
FIG. 8 is a view corresponding to FIG. 6 showing another modification of the invention for varying the stroke of a connecting rod.
Figure 9:
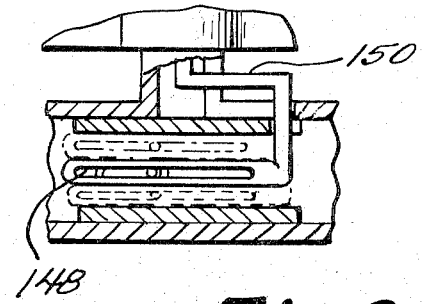
FIG. 9 is a fragmentary vertical sectional view of the valve mechanism and portions of the valve linkage shown in FIG. 8.

FIGS. 8 and 9 show a variation of the above embodiment in that the linkage 146 which controls the valve mechanism 144 extends through the stub shaft 128 and is held in a stationary position relative to mount 130. The result is that an elongated slot 148 is placed in the end portion of valve control lever 150, which is similar to lever 112 in its function. This elongated slot 148 is provided to allow the valve mechanism 144 and hydraulic motors 12 and 14 to move up and down relative to this slot since the lever 150 is not moved with them as is its counterpart in the previous embodiment 112.

Referring now to the manner in which the invention functions, the first embodiment demonstrates the use of the invention in the front wheel hub of a bicycle to vary the position of the axle 20 relative to the hub portion 10 of a wheel. As the rider propels the bicycle thus causing the front wheel to rotate he may move a lever, placed somewhere on the bicycle for the rider's convenience, which in turn through a series of linkages or similar means is ultimately attached to the rod 94 positioned in the central portion of the axis 20. The lever may be moved in such a way that it will cause the rod 94 to be moved inwardly or outwardly within the axle 20 which ever way the rider decides to move it. As the rod 94 is moved, say for example outwardly, it causes the cylindrical member 102 with its disc portions 104 to be moved along the axle 20, in turn causing lever 112 to be rotated and imparting similar movement thereby to the lever 120 attached to one end of shaft 122. Since the lever 92 is attached to an opposite end of shaft 122, it will also be rotated and will, thus, come into contact with ball 90 which, as a result, will be unseated thus allowing fluid to flow out of tube 86. As the fluid is allowed to flow out of the tube, it will apply a force to the other ball 90. As a result, that ball 90 will be unseated and the fluid will be allowed to flow into the other tube 86 and then into hydraulic cylinder 12. As the rider releases the lever, the valve lever 92 will return to its neutral position by the action of springs 108 and 116. Thus, the ball 90 will be returned to its seated position by spring 91 and also by the force of the fluid flowing out of tube 86, effectively stopping the flow of fluid in the valve mechanism 22.

If the rider then moves the lever at his disposal in the opposite direction causing the rod 94 to be moved in the opposite direction as well as all the other levers connected thereto, the result will be that the opposite ball 90 will be unseated and the fluid will flow out of hydraulic cylinder 12 through tube 86 and into the other tube 86 and thus into hydraulic cylinder 14.

Referring to FIG. 1, to aid in visualizing the manner in which the invention functions, assuming that it represents the initial position of the ends 16 within the hydraulic motors 12 and 14, then the axle will be positioned in what could generally be called the axis of symmetry and the wheel will rotate normally without imparting any reciprocal motion to the axle 20 relative to the hub 10. If the rider then moves the lever so as to allow fluid to flow out of hydraulic cylinder 14 as the wheel rotates, the force applied to the axle by the bicycle and the rider will cause the end 16 to push hydraulic fluid out of hydraulic motor 14 up through the valve mechanism 22 and into hydraulic motor 12. When this happens, the axle 20 will move radially outward relative to the hub 10 and as a result the wheel will rotate eccentrically about this axle and thus impart a reciprocal motion to the bicycle resulting in a motion similar to that felt by a rider of a horse when it is galloping, trotting, etc.

Considering the wheel to be rotated clockwise 90° from that position shown in FIG. 1, the maximum force would be applied by the rider and the weight of the bicycle to the lower end 16 and the minimum force will be applied to the upper end 16. However, because of the valve mechanism 22, no fluid will be allowed to flow out of the motor 12 because the ball valve will remain seated as force is applied to it by the hydraulic fluid. At various other degrees of rotation from that shown in FIG. 1, forces between the maximum and minimum described will be applied. Thus, as the wheel rotates, if the rider maintains the lever so that a valve is in an open position, the axle will continually progress radially outward from the center of the hub, resulting in greater and greater eccentric motion being imparted to the front forks of the bicycle and the axle will not slip backwards towards the center of the hub due to a force being applied in the opposite direction.

If the rider releases the lever at any point as the axle is progressing in its outward movement, it will be maintained in the position in which it was when the rider released the lever. If he then moves the lever in the opposite direction, the axle will progress inwardly towards the center of the hub until he again releases the lever. Thus, the position of the axle relative to the hub portion of the wheel may be moved to an infinite number of positions and held in a desired position while the wheel is rotating.

It should be noted that the embodiment of the invention just described can be utilized in the rear wheel of a bicycle as easily as in the front wheel since a driving sprocket would be attached to the outer race flange 64. Thus, the invention could be used on the front wheel, back wheel, or both wheels to provide the desired effect.

Referring now to the second application of the present invention as herein described, i.e., means for varying the stroke of a connecting rod, the following is a description of how this embodiment functions. In an analogous manner to the hub portion 10 to which the hydraulic motors 12 and 14 are attached, a housing 126 is journalled for rotation in a fixed mount 130. Also, the axle 20 of the wheel has its counterpart on a crank pin 136 to which, in this case, is attached a connecting rod 138.

The motivating force in this embodiment is applied via the connecting rod 138 to the pin 136 as the valve mechanism 22 is operated in a manner similar to that of the other embodiment the force applied causes the pin 136 to move radially inward or outward relative to the axis of rotation of the housing 126. As a result the radius of the pin 136 relative to the axis of rotation of the housing 126 can be changed, thus causing a change in the amount of lateral movement of the connecting rod 138 and thereby causing a change in the stroke of displacement of a piston or similar device attached to the end of the connecting rod.

Although the foregoing description illustrates the preferred embodiment of the present invention, it will be apparent to those skilled in the art that variations are possible. All such variations as would be obvious to those skilled in this art are intended to be included within the scope of this invention.

What I claim is:

1. Means for varying the position of a revolving part carried by a rotating body with respect to the axis of rotation of the body, said part being adapted to be rotatively connected to another part separate from the body, comprising: a pair of parallel oppositely arranged reciprocating single-acting hydraulic motors; means connecting one pair of adjacent ends of said motors to said part for causing radial displacement of said revolving part with respect to said axis of rotation of said body; means connecting the other ends of said motors to said body; conduit means connecting the chambers of said motors for flow of hydraulic fluid therebetween; and manually controllable reversible check valve means in said conduit means for controlling said flow.

2. The structure defined in claim 1 wherein the rotating body is a bicycle wheel and the movable part is the axle of said wheel.

3. The structure defined in claim 1 wherein the rotating body is a crank arm and the movable part is a stub shaft for a connecting rod.

4. The structure defined in claim 1 in which the valve means comprises a pair of ball check valves, each associated with a corresponding motor chamber for preventing flow of hydraulic fluid therefrom and manually controllable means for selectively alternately unseating said ball check valves or for allowing both to seat.

5. The structure defined in claim 4 in which the manually controllable means includes an axially-movable rod coaxial with the axis of rotation of the body.

6. The structure defined in claim 4 in which the manually controllable means includes an axially-movable rod coaxial with the axis of rotation of the movable part relative to another part.

* * * * *